(12) United States Patent
Judin et al.

(10) Patent No.: US 8,676,751 B2
(45) Date of Patent: Mar. 18, 2014

(54) HIGH AVAILABILITY DATABASE SYSTEMS AND METHODS

(75) Inventors: Jonna Maaria Judin, Dublin (IE); Fiona Kennedy, Dublin (IE); Slawomir Piotr Maludziński, Dublin (IE); Dale Murray McInnis, Aurora (CA); Mark John Mitten, Dublin (IE); Steve Raspudic, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/167,262

(22) Filed: Jun. 23, 2011

(65) Prior Publication Data

US 2012/0331335 A1 Dec. 27, 2012

(51) Int. Cl.
*G06F 7/00* (2006.01)
*G06F 17/00* (2006.01)

(52) U.S. Cl.
USPC .......................................................... 707/610

(58) Field of Classification Search
None
See application file for complete search history.

(56) References Cited

U.S. PATENT DOCUMENTS

| | | | |
|---|---|---|---|
| 5,434,995 A * | 7/1995 | Oberlin et al. | 713/375 |
| 7,383,293 B2 | 6/2008 | Gupta et al. | |
| 7,870,296 B2 * | 1/2011 | Fukutomi et al. | 709/248 |

OTHER PUBLICATIONS

Alan Robertson, "Linux-HA Heartbeat System Design", 4th Annual Linux Showcase & Conference, Atlanta Georgia Oct. 10-14, 2000, 12 pages.*

* cited by examiner

*Primary Examiner* — Uyen Le
(74) *Attorney, Agent, or Firm* — Schmeiser, Olsen & Watts LLP

(57) ABSTRACT

Described are systems and methods for communicating between a primary database and a standby database of a high availability data recovery (HADR) system. A plurality of primary partitions in a primary database and a plurality of standby partitions in a standby database are configured to communicate with each other. A transition of the plurality of primary partitions from a first HADR state to a second HADR state is synchronized.

19 Claims, 6 Drawing Sheets

HIGH AVAILABILITY DATABASE SYSTEMS AND METHODS

FIELD OF THE INVENTION

The present invention relates generally to high availability disaster recovery (HADR) database systems and methods, and more specifically, to systems and methods for synchronizing partitioned primary and standby databases.

BACKGROUND

Database systems are commonly employed by organizations for storing large amounts of data for easy and fast access. Accordingly, database systems are required to be reliable and scalable. In addressing the high reliability requirement, HADR database systems provide for a replication scheme by protecting against data loss in the event of a hardware or software failure. In particular, HADR database systems can replicate data changes from a source database, referred to as a primary database, to a target database, referred to as a standby database. In order for data replication to occur, the primary and standby databases are synchronized, and log data is shipped from the primary database to local log files on the standby database. Thus, the standby database can replace the primary database without a loss of data when the primary database experiences partial or complete failure during operation.

A database can be scaled by dividing the database into partitions, or nodes. Each database partition consists of its own data, indexes, configuration files, and transaction logs. Database partitioning can occur within a single server or across a cluster of servers, where partitions can be located on different database servers.

One such partitioning arrangement is referred to as Database Partitioning Feature (DPF), which provides a great deal of flexibility for physically or logically partitioning databases. For example, a database organization scheme can be employed in which table data is divided by DPF across multiple DPF partitions. Each table row is distributed to a database partition. When a query is processed, the request is divided so each database partition processes the table rows it is responsible for. The ability to divide a table across multiple storage objects using DPF permits the size of the table to be increased, resulting in greater scalability of a database system.

When an HADR database configuration includes a DPF environment, a primary database is divided into a plurality of primary partitions and a standby database divided into a plurality of standby partitions. Each database partition can have its own set of computing resources, including a processor such as a CPU and storage. Each primary partition, also referred to as an active partition, is configured for pairing with a standby partition. Thus, the primary partitions can be synchronized with their corresponding standby partitions, whereby log data is shipped to the corresponding standby partitions, such that the partitioned standby database can replace the primary database in a takeover operation.

BRIEF SUMMARY

An embodiment features a computer-implemented method of communication between a primary database and a standby database of a high availability data recovery (HADR) system. A plurality of primary partitions in a primary database and a plurality of standby partitions in a standby database are configured to communicate with each other. A transition of the plurality of primary partitions from a first HADR state to a second HADR state is synchronized. A barrier state is positioned between the first HADR state and the second HADR state. A primary partition is prevented from entering the second HADR state until all of the primary partitions are in the barrier state.

Another embodiment features a computer-implemented method of synchronization between HADR states of a database. A catalog node receives a state of a primary node. A communication occurs between a catalog node and a plurality of nodes. Each node transitions between HADR states. The catalog node determines when all of the nodes are in a same barrier state. The catalog node instructs the nodes that can enter an HADR state.

Another embodiment features a computer program product for displaying a contact list. The computer program product comprises a computer readable storage medium having computer readable program code embodied therewith. The computer readable program code comprises computer readable program code configured to establish to permit a plurality of primary partitions in a primary database and a plurality of standby partitions in a standby database to communicate with each other, computer readable program code configured to synchronize a transition of the plurality of primary partitions from a first HADR state to a second HADR state, computer readable program code configured to position a barrier state between the first HADR state and the second HADR state, and computer readable program code configured to prevent a primary partition from entering the second HADR state until all of the primary partitions are in the barrier state.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

Figure 1:
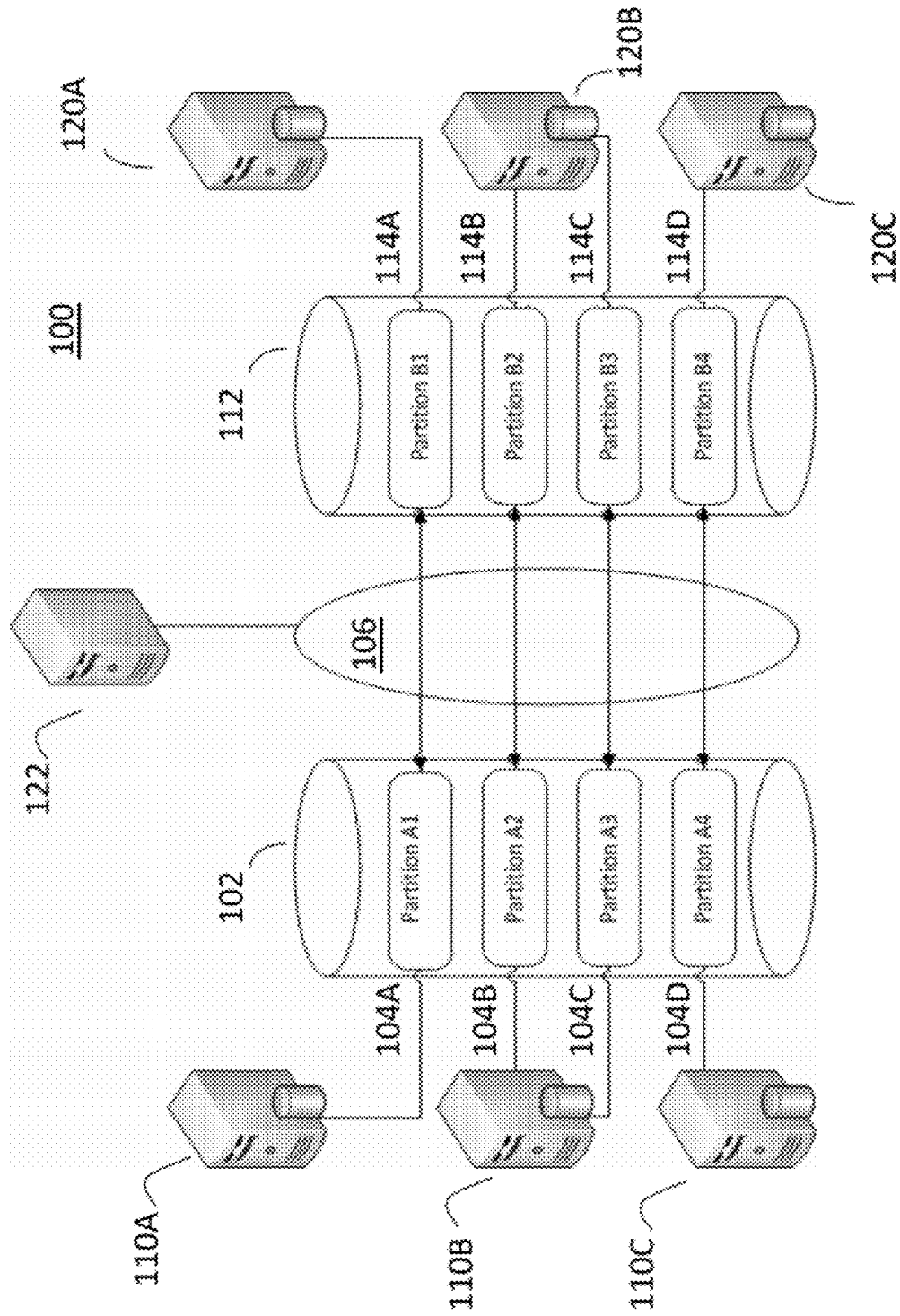
FIG. 1 is a block diagram illustrating an HADR database environment including partitioned primary and standby databases, in which embodiments of the present inventive concepts can be practiced.

FIG. 1 is a block diagram illustrating an HADR database environment 100 in which embodiments of the present inventive concepts can be practiced. The HADR database environment 100 includes a primary database 102 and a standby database 112, each partitioned according to DPF.

The primary database 102 can be located in a single server, for example, server 110A, or on multiple servers 110A, 110B, 110C (generally, 110), for example, in a cluster configuration. Similarly, the standby database 112 can be located in a single server, for example, server 120A, or on multiple servers 120A, 120B, 120C (generally, 120), for example, in a cluster configuration. The primary database 102 and the standby database 112 can communicate with each other via a network 106. Each server 110, 120 can include at least a processor such as a CPU, a memory device, and a network interface (not shown) that can communicate with each other over one or more communications busses, for example, a Peripheral Component Interconnect (PCI) bus. The memory device stores program code corresponding to an operating system and/or applications in accordance with embodiments described herein. The memory device includes at least one of non-volatile computer storage media, such as read-only memory (ROM) and volatile computer storage media, such as random-access memory (RAM). A basic input/output system (BIOS) can be stored in the ROM, which contains program code for controlling basic operations of each server 110, 120, including initialization of hardware. Program code and data described herein can be stored in the RAM, such as program code corresponding to the systems and methods described herein.

The network interface can include one or more connectors known to those of ordinary skill in the art, depending on the network type, e.g., LAN, WAN, wireless, and the like, permitting the databases 102, 112 to communicate with each other and/or with other electronics devices, e.g., computers, mobile devices, servers, and the like, via the network 106 according to one or more data communications protocols, for example, TCP/IP.

In an embodiment, the primary database 102 is divided into a plurality of partitions 104A-104D (generally, 104), referred to as primary partitions, according to a DPF partitioning arrangement. The primary partitions 104 can be stored on different servers, for example, servers 110A, 110B, or can be on a same server, for example, server 110A. In an embodiment, the standby database 112 is divided into a plurality of partitions 114A-114D (generally, 114), referred to as standby partitions, according to a DPF arrangement. The standby partitions 114 can be stored on different servers, for example, servers 120A, 120B, or can be on a same server, for example, server 120A. The standby partitions 114 can communicate with one or more corresponding primary partitions 104 via the network 106 according to a data communications protocol such as TCP/IP. In accordance with the DPF partitioning arrangement, each primary partition 104A-104D is configured to communicate with a corresponding standby partition 114A-114D. For example, the primary partition 104A can be paired with the standby partition 114A, and can exchange data with the standby partition 114A.

In the HADR synchronization environment 100, if a database, for example, the primary database 102, completely or partially fails, then the standby database 112 can assume the transactional workload of the primary database 102 in a takeover operation. In order for a takeover operation to proceed, the primary database 102 and the standby database 112 are synchronized with each other to ensure the transfer of log data from the primary database 102 to the standby database 112.

The HADR synchronization environment 100 also includes a catalog node 122, also referred to as a coordinating node. The catalog node 122 includes a processor, a memory, a network interface, and other components similar to the servers 110, 120 described herein. The catalog node 122 communicates with the servers 110 via the network 106 according to one or more data communications protocols, for example, TCP/IP. The catalog node 122 can coordinate the synchronization of database partitions between HADR states during an operation, for example, a takeover operation. In doing so, the catalog node 122 can receive information related to a state of the primary database 102, more specifically, the primary partitions 104. The catalog node 122 can determine such information by discovery, for example, proactively requesting status information from databases in communication with the catalog node 122 such as the primary database 102.

Figure 2:
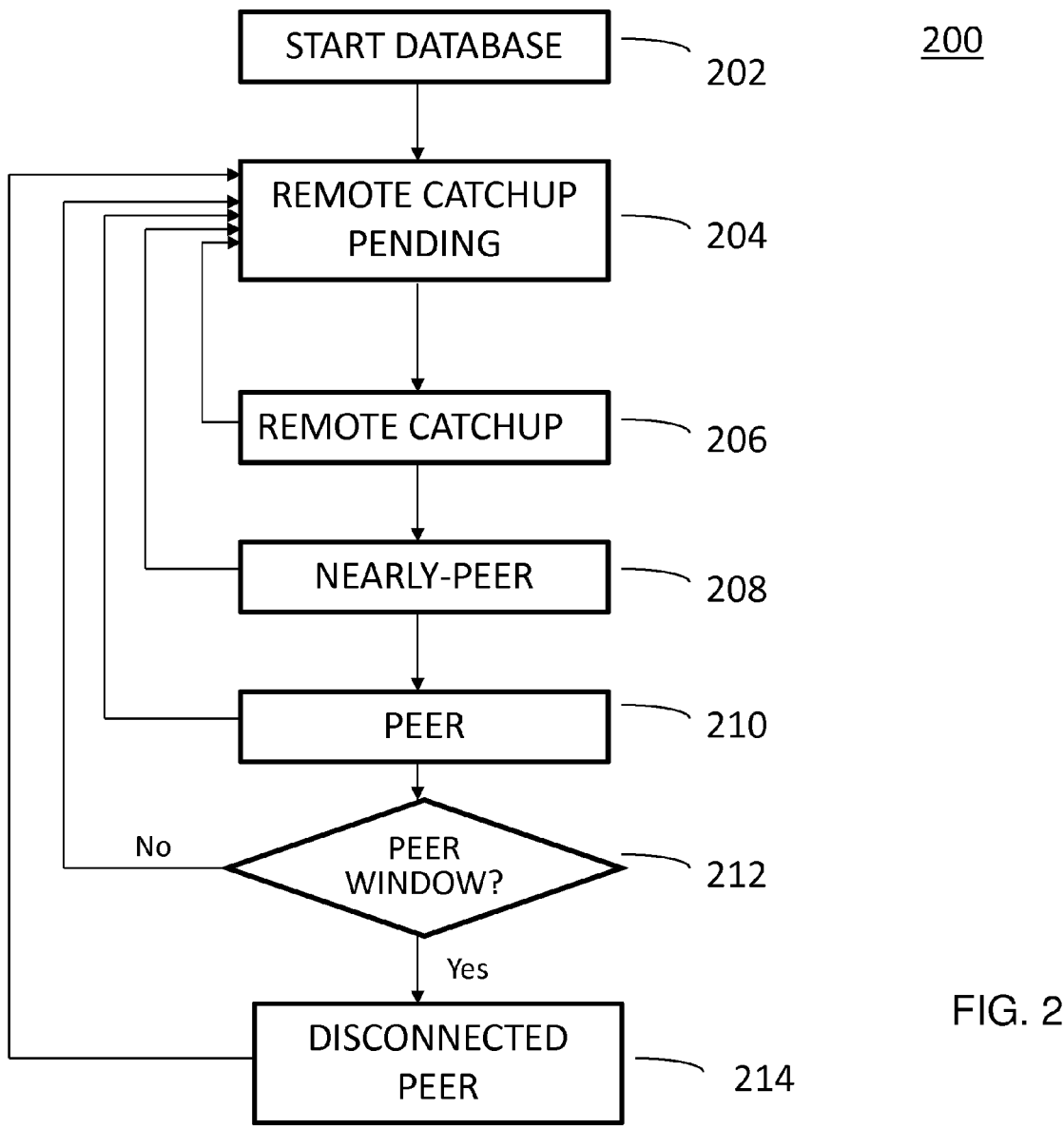
FIG. 2 is a flow diagram illustrating a process for transitioning between HADR states of a primary database, in accordance with an embodiment.

FIG. 2 is a flow diagram illustrating a process 200 for transitioning between HADR states of a primary database, in accordance with an embodiment. In describing FIG. 2, reference is made to elements of FIG. 1, in particular, the primary database 102, the standby database 112, and the catalog node 122.

The process 200 begins with starting the primary database 102. The primary partitions 104A-104D of the primary database 102 can then enter a remote catchup pending state 204. Alternatively, the primary database 102 can enter the remote catchup pending state 204 when a HDR_COMM_CONNECTED event occurs, i.e., the standby database 112 is in sufficient communication with the primary database 102 such that handshaking between the primary database 102 and the standby database 112 is successful. The primary database 102 can alternatively enter the remote catchup pending state 204 when the primary database 102 is in another HADR state, for example, a peer state 210, and a connection is broken in the other state between one or more primary partitions 104A-104D and their corresponding standby partitions 114A-114D.

The primary partitions 104A remain in the remote catchup pending state 204 until a connection with the standby database 112 is established. The standby database 112 can contact the primary database 102, for example, by sending an HDR_MSG_LSOREQ, which is sent by the standby database 112 to the primary database 102 when the standby database 112 has reached a remote catchup state, instructing the primary database 102 to initiate a remote catchup at the specified log stream offset (LSO). In response, the primary database 102 can enter the remote catchup state 206. In the remote catchup state 206, each primary partition 104A-104D can send its log files to a standby partition 114A-114D of the standby database 112 that is paired with the primary partition 104.

The primary database 102 can enter a nearly-peer state 208 after receiving a message from the standby database 112, for example, a HDR_MSG_NPEERACK message, indicating that the standby database 112 has completed a replay of the log files. The standby database 112 also waits for the primary database 102 to process any pending log data. The primary database 102 reaches an end of the log when in the remote catchup state 206. The primary database 102 can send a NEARLY PEER message to the standby database 112. In response, the standby database 112 can send a NEAR PEER ACK message, whereby the primary database 102 transitions to the nearly-peer state 208, which suspends log writing and performs another log scan similar to that when in the remote catchup state 206.

The primary database 102 can enter a peer state 210 after the log data on the primary database 102 is received by the standby database 112. In the peer state 210, the standby database 112 can be updated with log pages on the primary database 102 written to log files on the standby database 112 to ensure that the primary database 102 and the standby database have identical log file sequences. Accordingly, the standby database 112 can assume the role of the primary database 102 in the event of a failure of the primary database 102.

If the connection between a primary partition 104 and a standby partition 114 is lost when in the peer state 210, a determination can be made as to whether a peer window 212 is enabled. The peer window relates to the duration of time during which the primary partition 104 remains in a disconnected peer state 214 after losing its connection with its corresponding standby partition 104. If the peer window is enabled and if the peer window time value is greater than zero, then if the primary partition 104 loses its connection with the standby partition 114, and the primary partition 104 can continue to behave as though it is in a peer state, even if it is instead in the disconnected peer state 214 for the configured duration of time. Otherwise, if the peer window time value is 0 or not enabled, then the primary partition 104 can transition to the remote catchup pending state 204. When the connection to the standby partition 114 is restored, or the peer window expires, the primary database 102 can transition from the disconnected peer state 214 to the remote catchup pending state 204.

A HADR database configured for DPF requires that each primary partition be synchronized with a corresponding standby partition. Thus, log replays on one partition are generally independent of a log replay on any other partition. However, if a partition, for example, a standby partition, falls out of a peer state during a takeover operation, a log mismatch can occur between the primary database 102 and the standby database 112. Synchronization problems can also arise when a partitioned database transitions between HADR states.

The present inventive concepts provide a synchronization barrier for HADR state transitions by requiring all partitions of a database to be in a same barrier state before transitioning to a next HADR state. For example, systems and methods of the present inventive concepts can ensure database consistency across all database partitions in a DPF environment in the event that a standby partition falls out of a peer state at takeover time. In one embodiment, all partitions enter an into-peer-sync state prior to transitioning to a peer state. In another embodiment, all partitions enter an out-of-peer-sync state prior to transitioning to a remote catchup pending state. The primary partitions are disconnected from their corresponding standby partitions prior to entering a barrier state. Reconnection can occur after all of the primary partitions have transitioned from the barrier state to the next HADR state. The above can be achieved by a primary HADR state machine, which acts as a sync barrier. A synchronization protocol can also be provided that manages the transitioning of partitions to ensure that all partitions are in a same barrier state before transitioning to a new HADR state.

Figure 3:
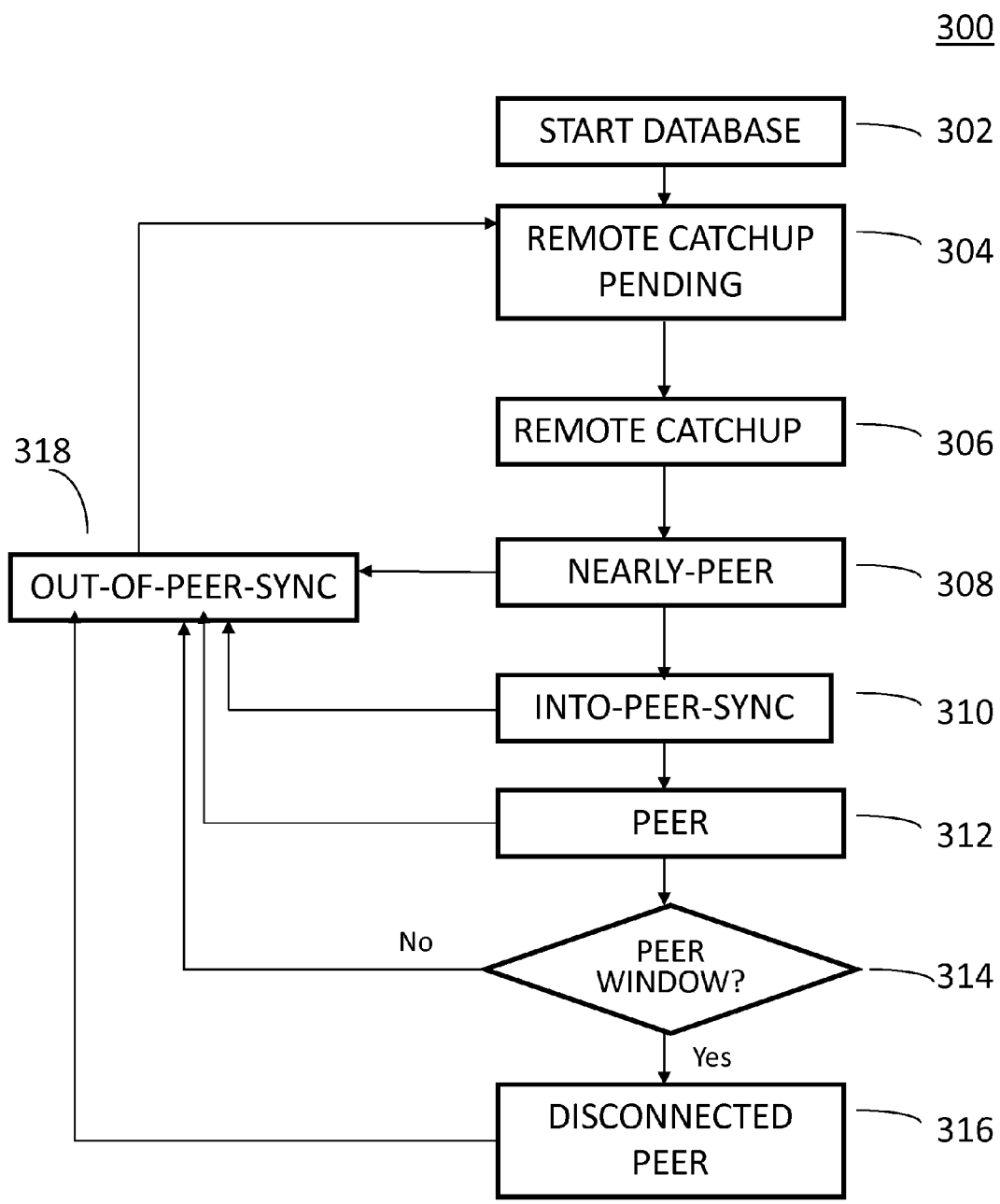
FIG. 3 is a flow diagram illustrating a process for synchronizing DPF primary partitions for transitioning between HADR states, in accordance with an embodiment.

FIG. 3 is a flow diagram illustrating a process 300 for synchronizing the transition of one or more DPF primary partitions between HADR states, in accordance with an embodiment. In describing FIG. 3, reference is made to FIGS. 1 and 2. The start database 302, remote catchup pending 304, remote catchup 306, and nearly peer 308 steps shown in FIG. 3 are similar to steps 202, 204, 206, and 208 described in FIG. 2 and will therefore not be repeated here for brevity. In describing FIG. 3, reference is made to elements of FIG. 1, in particular, the primary database 102, the standby database 112, and the catalog node 122.

Each primary partition 104A-104D of the primary database 102 can enter an into-peer-sync state 310 from the nearly peer state 308 when the standby database 112 has completed rolling log data that is generated on the primary database 102 and shipped to the standby database 112. The into-peer-sync state 310 ensures a synchronized transition of the primary partitions 104 to the peer state 312. The primary database 102 can enter the peer state 312, and can establish a peer communication with the standby database 112, after all primary partitions 104 of the primary database 102 enter the into-peer-sync state 310.

The primary database 102 and the standby database 112 can remain in the peer state 312 until a primary partition 104 or a standby partition 114 falls out of the peer state 312. The catalog node 122 can instruct the other primary partitions 104 to likewise fall out of the peer state 312. The primary partitions 104 can enter the out-of-peer-sync state 318. Alternatively, a connection can be lost between the primary database 102 and the standby database 112. A determination can be made as to whether a peer window 314 is enabled. If the peer window is enabled and if the peer window time value is greater than zero, then the primary partitions 104 can enter the disconnected peer state 316, where the primary partitions 104 can continue to behave as though they are in a peer state with the standby partitions 114 for the configured amount of time.

If the peer window time value is 0 or not enabled, then the primary partitions 104 can enter the out-of-peer-sync state 318. If the connection to the standby database 112 is restored, or the peer window expires, or a request is received to fall out of peer, then the primary partitions 104 can transition from the disconnected peer state 214 to the out-of-peer-sync state 318.

The out-of-peer sync state 318, similar to the into-peer-sync state 310, can be a synchronization barrier, in that all primary partitions 104 can be required to be in the out-of-peer-sync state 318 before the primary database 104 transitions to a different state such as the remote catchup pending state 304. The external behavior of the out-of-peer sync state 318 can be similar to that of the disconnected peer state 214 except that here the connection is closed and all requests from the standby database 112 to reconnect are rejected. Also, there is no timeout to exit from the out-of-peer sync state 318. Upon entry into the out-of-peer sync state 318, all connections between the primary partitions 104 and the standby partitions 114 are dropped. If attempts are made to reestablish such connections, for example, during a transition from the disconnected peer state 316 to the out-of-peer sync state 318, the connections will be dropped. When the partitions 104 are in the barrier state, for example, the into-peer-sync state 310 or the out-of-peer sync state 318, and transition to a next HADR state, for example, the peer state 312 or the remote catchup pending state 304, such connections can be reestablished with the standby database 112.

Figure 4:
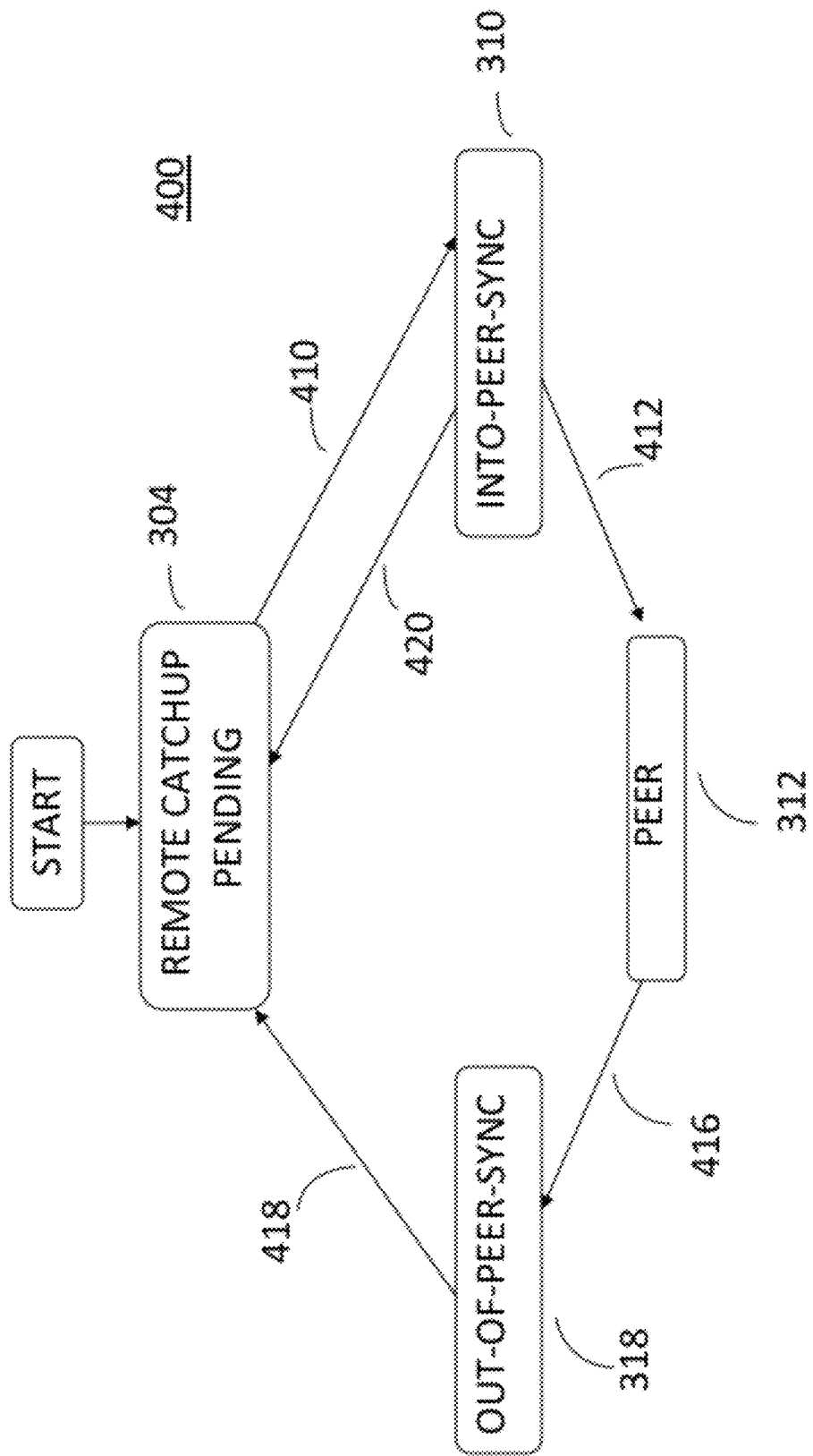
FIG. 4 is a state diagram corresponding to the flow diagram illustrated in FIG. 3, in accordance with an embodiment.

FIG. 4 is a diagram 400 illustrating a series of states and transitions in a high available database system, in accordance with an embodiment. In describing FIG. 4, reference is made to the HADR synchronization environment 100 illustrated in FIG. 1 and the flow diagram 300 illustrated in FIG. 3. In applying the states and transitions of FIG. 4, the catalog node 122 illustrated in FIG. 1 can coordinate a synchronization of the primary partitions 104 between the remote catchup pending state 304, the into-peer-sync state 310, the peer state 312, and the out-of-peer sync state 318. In doing so, the catalog node 122 relies on reported and discovered states of other nodes, for example, nodes related to the primary database 102 and/or the standby database 112. The catalog node 122 can retain information regarding the states of the nodes, which can send messages with their current state. The catalog node 122 can determine whether it is possible to contact other nodes. If not, the node is considered to be in a disconnected state.

A DPF partition can enter the remote catchup pending state 304 for reasons similar to those described in FIGS. 2 and 3, for example, in response to a takeover by force request submitted by the standby database 112, or when the primary database 102 loses connection with the standby database 112. The remote catchup pending state 304 can be similar to the remote catchup pending state 304 described with reference FIG. 3 and will therefore not be repeated here for brevity. Although not shown in FIG. 4, the DPF partition can transition to a remote catchup state and/or a nearly-peer state similar to states 206 and 208 illustrated in FIG. 2, or similar to states 306 and 308 illustrated in FIG. 3.

The DPF partition sends a message 410 to the catalog node 122 indicating that the DPF partition has entered or is transitioning to the into-peer-sync state 310. While in the into-peer-sync state 310, if the DPF partition loses connection to a corresponding standby node 114A, then the DPF partition transitions 420 from the into-peer-sync state 310 to the remote catchup pending state 304.

The catalog node 122 sends a message to the DPF partition when all primary partitions 104 are in the into-peer-sync state 310, instructing the DPF partition to enter the peer state 312. The DPF partition can send an acknowledgement to the catalog node 122, confirming the transition of the primary partitions 104 to the peer state 312. Without the into-peer-sync state 310, a successful transition of all DPF partitions of a database to the peer state 312 cannot be assured. The into-peer-sync state 310 acts as a synchronization barrier by prohibiting DPF partitions from transitioning to the peer state 312 unless all DPF partitions are in the into-peer-sync state 310.

The DPF partition can transition from the peer state 312 to the out-of-peer-sync state 318 when the DPF partition receives a message from the catalog node 112 instructing the one or more partitions 104 fall out of the peer state, or the node otherwise loses its connection to the standby database 112. The node enters the out-of-peer sync state 318 and sends an out-of-peer-sync message to the catalog node 122, indicating that the partitions 104 have transitioned to the out-of-peer sync state 318.

Accordingly, the out-of-peer sync state 318, like the into-peer-sync state 310, can synchronize the transition of the primary partitions 104 to a next state, for example, the remote catchup pending state 304. Without the into-peer-sync state 310 and/or the out-of-peer sync state 318, if problems occur with synchronizing with the catalog node 122, for example, a network timeout, the failing node may incorrectly submit a new synchronization request, resulting in a possible log mismatch.

Figure 5A:
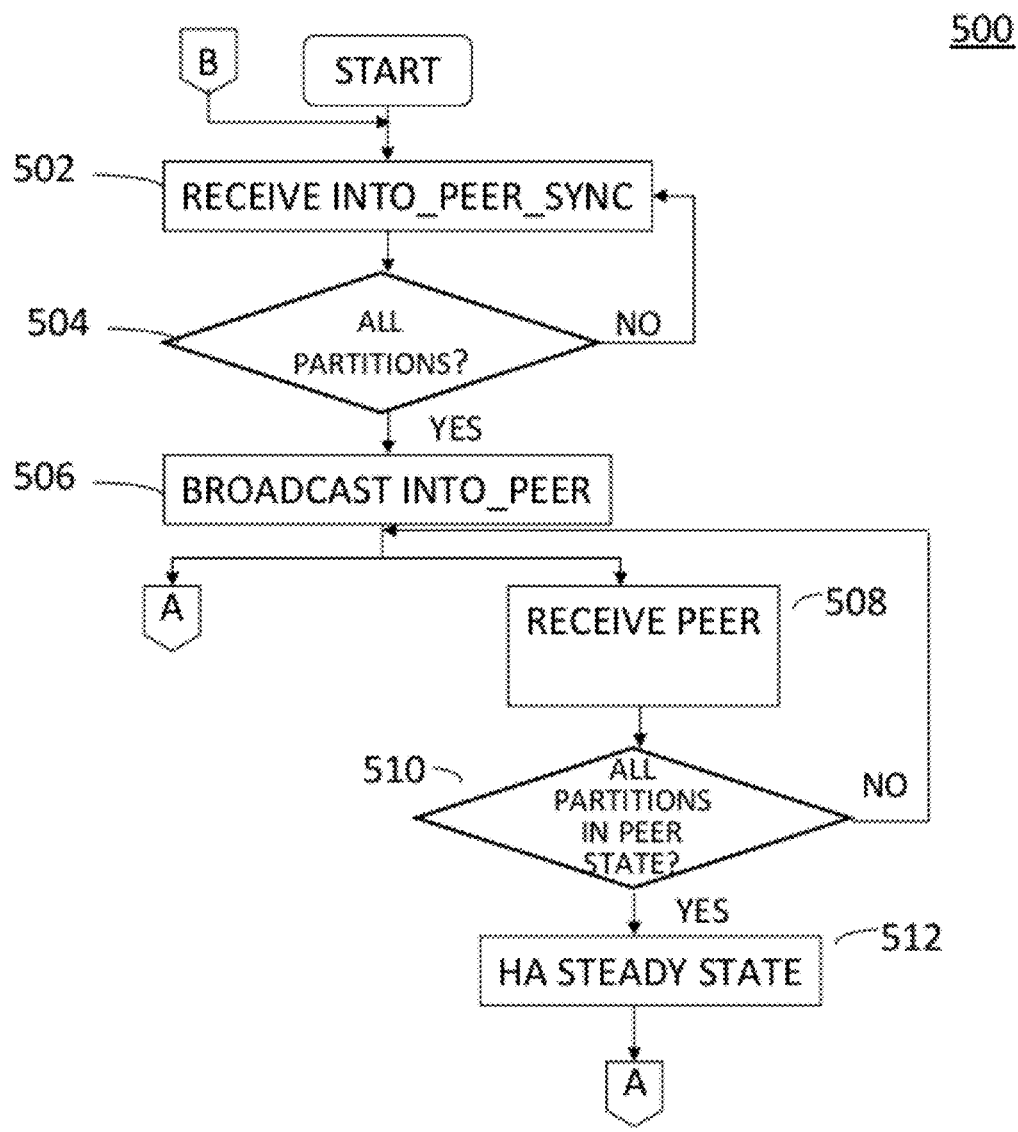
FIGS. 5A and 5B are flow diagrams illustrating a process for synchronizing DPF partitions in communication with a catalog node, in accordance with an embodiment.
Figure 5B:
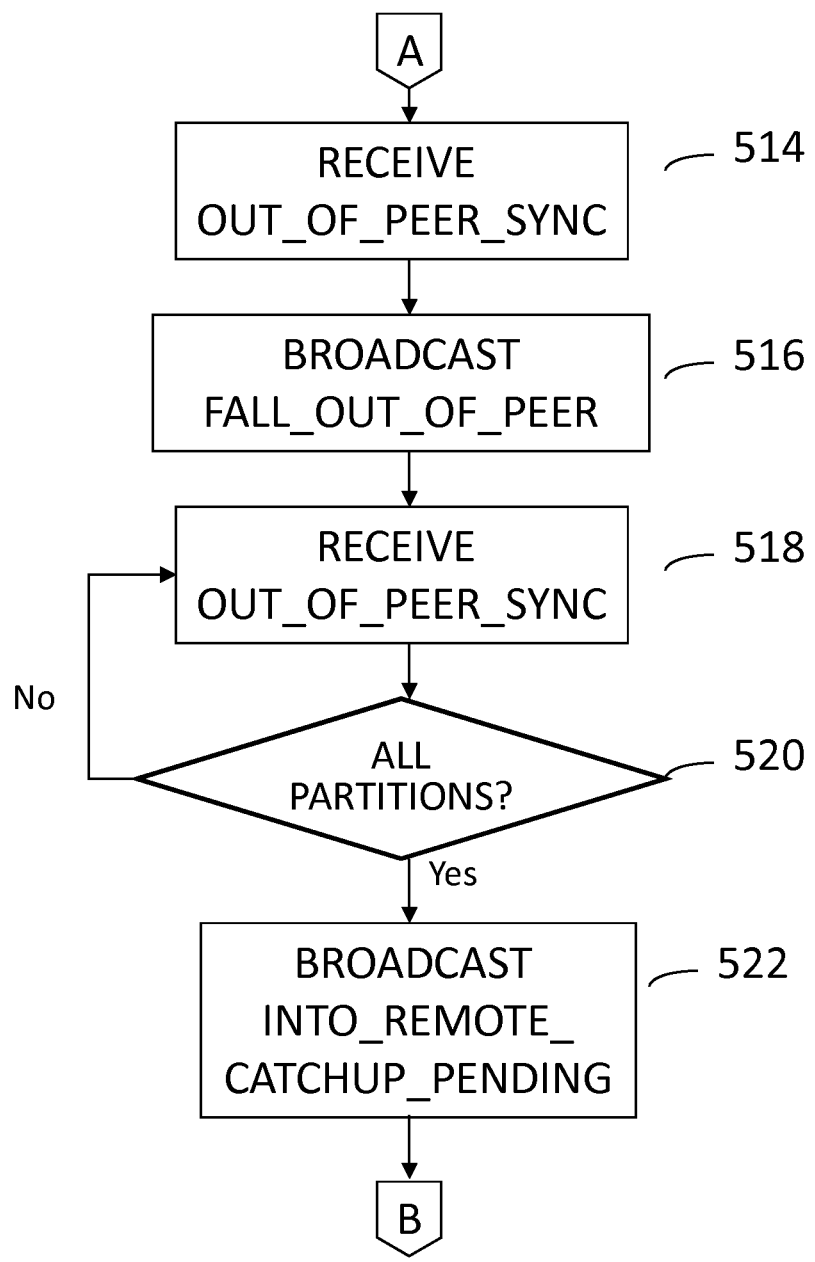

FIGS. 5A and 5B are flow diagrams illustrating a process 500 for synchronizing a plurality of DPF partitions utilizing a catalog node, in accordance with an embodiment. In describing FIG. 5, reference is made to elements of FIGS. 1-4. The process 500 determines when all DPF partitions of a primary database are in a same HADR state and synchronously transitions the DPF partitions between HADR states. For example, the catalog node 122 can coordinate the synchronization of the DPF partitions from the into-peer-sync state 310 to the peer state 312, and/or from the out-of-peer sync state 318 to the remote catchup pending state 304 illustrated in FIGS. 3 and 4.

A DPF partition 104 can be in a remote catchup state 306 or a nearly-peer state 308, and in communication with a corresponding standby node 114. Each DPF partition 104 can send an into-peer sync message 502 to the catalog node 122, providing a status of a transition of the DPF partition 104 to the into-peer-sync state 310.

The catalog node 122 determines 504 whether all DPF partitions 104 are in the into-peer-sync state 310, for example, based on whether it receives an into-peer-sync message 502 from each DPF partition. If no, then the catalog node 122 continues to receive into-peer-sync messages 502 until all DPF partitions 104 are in the into-peer-sync state 310. If yes, then the catalog node 122 broadcasts an into-peer message 506 to the DPF partitions 104, instructing the DPF partitions 104 to enter the peer state 312 with a corresponding standby node.

The catalog node 122 can receive a peer message 508 from each DPF partition 104, indicating that the DPF partition 104 is in the peer state 312. The catalog node 122 determines 510 whether all DPF partitions 104 are in the peer state 312, for example, by receiving peer messages 508 from each DPF partition 104. If all DPF partitions 104 are determined to be in the peer state 312, then the DPF partitions 104 can enter a high availability (HA) steady state 512, whereby the DPF partitions 104 exchange logs and the like with the corresponding standby nodes 114. If the catalog node 122 determines that not all of the DPF 104 are in the peer state 312, the catalog node 122 can continue to receive messages from the DPF partitions 104 until all DPF partitions 104 are in the peer state 312.

Alternatively, the catalog node 122 can receive an out_of_peer sync message 516 from one or more DPF partitions 104 in response to the into-peer message 506, or when the DPF partitions are in the HA steady state 512 or other state such as the into-peer-sync state 310, or the disconnected peer state 316 shown in FIG. 3, indicating that the one or more DPF partitions 104 has transitioned to the out-of-peer sync state 318.

If a DPF partition 104 transitions to the out-of-peer sync state 318 in this manner, then the catalog node 122 broadcasts a fall_out_of_peer request 516 to the remaining DPF partitions 104, instructing them to likewise transition to the out-of-peer sync state 318. The other DPF partitions 104 each sends an out-of-peer sync message 518 to the catalog node 122, indicating that the DPF partition 104 has transitioned to the out-of-peer sync state 318. The catalog node 122 determines 520 whether all DPF partitions 104 are in the out-of-peer-sync state 318, for example, based on whether the catalog node 122 receives an out-of-peer-sync message 518 from each DPF partition 104. If no, then the catalog node 122 continues to receive out-of-peer-sync messages 518 from the DPF partitions 104 until all connected DPF partitions 104 are in the out-of-peer-sync state 310. If yes, then the catalog node 122 broadcasts an into-remote-catchup-pending message 522 to the DPF partitions 104, instructing the DPF partitions 104 to transition to the remote catchup pending state 304.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method of communication between a primary database and a standby database of a high availability disaster recovery (HADR) system, comprising:
    configuring a plurality of primary partitions in a primary database and a plurality of standby partitions in a standby database, the primary partitions constructed and arranged to each transition between a first HADR state and a second HADR state;
    synchronizing a transition of the plurality of primary partitions from the first HADR state to the second HADR state, comprising:
        positioning a barrier state between the first HADR state and the second HADR state;
        preventing a primary partition of the plurality of primary partitions from entering the second HADR state until all of the primary partitions of the plurality of primary partitions are in the barrier state; and
    wherein the plurality of primary partitions transition from the first HADR state to the second HADR state during a takeover operation between the primary database and the standby database.

2. The computer-implemented method of claim 1, wherein the barrier state is an into-peer-sync state and the second HADR state is a peer state, and wherein the plurality of primary partitions are prevented from transitioning to the peer state until each primary partition of the plurality of primary partitions is in the into-peer sync state.

3. The computer-implemented method of claim 1, wherein the first HADR state is a remote catchup pending state, a remote catchup state, or an HADR nearly peer state.

4. The computer-implemented method of claim 1, wherein the barrier state is an out-of-peer-sync state and the second HADR state is a remote catchup pending state, and wherein the plurality of primary partitions are prevented from transitioning to the remote catchup pending state until each primary partition of the plurality of primary partitions is in the out-of-peer sync state.

5. The computer-implemented method of claim 4, wherein the first HADR state is a peer state or a disconnected peer state.

6. The computer-implemented method of claim 1, wherein synchronizing the transition of the plurality of primary partitions from the first HADR state to the second HADR state comprises:
   sending information related to the states of the plurality of primary partitions to a catalog node; and
   sending instructions from the catalog node to the plurality of primary partitions to transition to the second HADR state.

7. The computer-implemented method of claim 6, wherein the catalog node coordinates the synchronization of the plurality of primary partitions from an into-peer-sync state to a peer state, and from an out-of-peer sync state to a remote catchup pending state.

8. The computer-implemented method of claim 6, wherein the catalog node performs a discovery to determine if one or more primary partitions of the plurality of primary partitions is in a disconnected state.

9. The computer-implemented method of claim 1, wherein the barrier state includes an out-of-peer-sync state and the second HADR state includes a remote catchup pending state, and wherein synchronizing the transition of the plurality of primary partitions from the first HADR state to the second HADR state includes requiring that all primary partitions enter the out-of-peer-sync state before any of the primary partitions transition to the remote catchup pending state.

10. The computer-implemented method of claim 1, further comprising transitioning the primary partitions from the first HADR state to a barrier state, including:
   detecting that a first primary partition of the plurality of primary partitions has fallen out of the first HADR state;
   transitioning the first primary partition to a barrier state;
   disconnecting a second primary partition of the plurality of primary partitions from a corresponding standby partition of the plurality of standby partitions;
   transitioning the second primary partition to the barrier state; and
   transitioning the first and second primary partitions from the barrier state to the second HADR state in response to the plurality of primary partitions being in the barrier state.

11. The computer-implemented method of claim 1 further comprising preventing a connection between a primary partition and a standby partition when an attempt is made to reestablish the connection in a transition to the barrier state.

12. A computer-implemented method of synchronization between HADR states of a database, comprising:
   receiving by a catalog node a state of a partition of a plurality of database partitions;
   communicating between the catalog node and the plurality of database partitions, each partition transitioning between HADR states;
   determining by the catalog node when all of the partitions of the plurality of database partitions are in a same barrier state; and
   instructing by the catalog node any partitions of the plurality of database partitions that can enter an HADR state.

13. The computer-implemented method of claim 12, wherein the barrier state is an into-peer-sync state or an out-of-peer sync state.

14. The computer-implemented method of claim 12, wherein the HADR state is a peer state or a remote catchup pending state.

15. The computer-implemented method of claim 12, further comprising preventing the partition of the plurality of partitions from entering the HADR state until all database partitions of the plurality of database partitions are in the same barrier state.

16. The computer-implemented method of claim 12, wherein the catalog node coordinates the synchronization of the partitions of the plurality of database partitions from an into-peer-sync state to a peer state, and from an out-of-peer sync state to a remote catchup pending state.

17. The computer-implemented method of claim 12, wherein the catalog node performs a discovery to determine if one or more database partitions of the plurality of database partitions is in a disconnected state.

18. The computer-implemented method of claim 12 further comprising preventing a connection between the partition and a corresponding standby partition when an attempt is made to reestablish the connection in a transition to the barrier state.

19. A computer program product for communication between a primary database and a standby database of a high availability disaster recovery (HADR) system, the computer program product comprising:
   a computer readable storage medium having computer readable program code embodied therewith, the computer readable program code comprising:
   computer readable program code configured to configure a plurality of primary partitions in a primary database and a plurality of standby partitions in a standby database, and to construct and arrange the primary partitions to each transition between a first HADR state and a second HADR state;
   computer readable program code configured to synchronize a transition of the plurality of primary partitions from the first HADR state to the second HADR state;
   computer readable program code configured to position a barrier state between the first HADR state and the second HADR state;
   computer readable program code configured to prevent a primary partition of the plurality of primary partitions from entering the second HADR state until all of the primary partitions of the plurality of primary partitions are in the barrier state; and
   wherein the plurality of primary partitions transition from the first HADR state to the second HADR state during a takeover operation between the primary database and the standby database.

* * * * *